United States Patent [19]

Levi

[11] Patent Number: 5,482,326
[45] Date of Patent: Jan. 9, 1996

[54] APPARATUS PROVIDING A PIVOT AXIS TO REAR WHEELS

[76] Inventor: Abraham Levi, Moshav Bet HaLevy 42870, Israel

[21] Appl. No.: 374,496

[22] Filed: Jan. 18, 1995

[30] Foreign Application Priority Data

Jan. 19, 1994 [IL] Israel ......................................... 108376

[51] Int. Cl.⁶ .................................................. B60G 5/00
[52] U.S. Cl. ........................... 280/682; 280/679; 280/677; 180/24.02
[58] Field of Search ............................. 180/24.02, 24.13; 280/677, 679, 682, 678, 688, 725

[56] References Cited

U.S. PATENT DOCUMENTS

| | | | |
|---|---|---|---|
| 2,434,693 | 1/1948 | Graham | 280/677 |
| 3,014,235 | 12/1961 | Lich | 280/678 |
| 3,366,399 | 1/1968 | Hanger | 180/24.02 |
| 3,450,221 | 6/1969 | Nelson | 180/24.02 |
| 4,192,528 | 3/1980 | Bergquist | 280/677 |
| 4,974,684 | 12/1990 | Sterons | 280/677 |

FOREIGN PATENT DOCUMENTS

| | | | |
|---|---|---|---|
| 1252924 | 12/1960 | France | 280/677 |
| 2710609 | 9/1978 | Germany | 280/677 |
| 0604329 | 3/1960 | Italy | 280/678 |
| 988746 | 4/1965 | United Kingdom . | |
| 2128942 | 5/1984 | United Kingdom . | |

OTHER PUBLICATIONS

Search Report of British Patent Application, Ser. No.: GB 9500956.9 Dated 10 Apr. 1995.

*Primary Examiner*—Margaret A. Focarino
*Assistant Examiner*—Christopher Eilis
*Attorney, Agent, or Firm*—Haynes & Davis

[57] ABSTRACT

Apparatus providing a pivot axis for rear wheels of a vehicle is disclosed. The vehicle has a chassis, an arm pivotally attached to the chassis and four rear wheels divided into two forward wheels and two rearward wheels. The apparatus of the present invention has two halves, wherein each half includes a rocking member and a ground directing member. The rocking member is pivotally attached to the arm at a central location on the rocking member and rotatably connected to one forward and one rearward wheel at front and back locations, respectively, of the rocking member. The ground directing unit is pivotally attached to the arm and to the rocking member near the rearward wheel. Accordingly, the ground directing unit provides a force to the rearward wheel while no force is provided to the forward wheel.

16 Claims, 5 Drawing Sheets

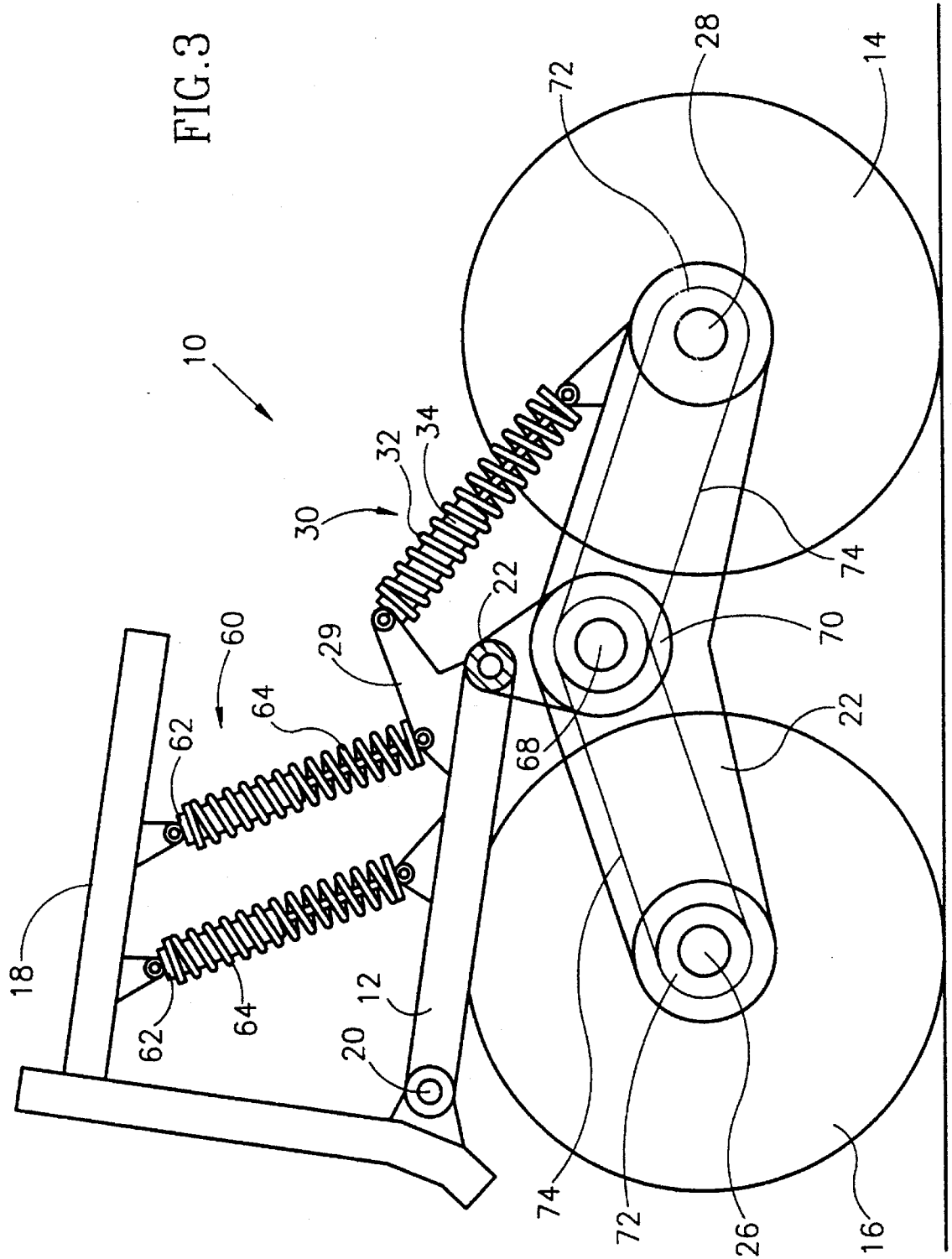

5,482,326

APPARATUS PROVIDING A PIVOT AXIS TO REAR WHEELS

FIELD OF THE INVENTION

The present invention relates to six wheel vehicles having two front wheels and four rear wheels generally and to apparatus for providing a rear pivot axis to such a vehicle.

BACKGROUND OF THE INVENTION

Six wheel vehicles, such as truck cabs and truck cabs combined with a vehicle having four rear wheels, are known in the art. They are typically utilized for carrying heavy loads.

Typically, the two rear wheels on each side of the vehicle are connected together via a timing belt so as to ensure that the wheels rotate together in tandem. The wheels can either rotate freely, or if there is rear wheel drive, they can be powered through a rotating axle connected to the differential of the vehicle.

Typically, the vehicle also includes shock absorbers enabling the chassis of the vehicle to remain relatively stable while the wheels rise up and down over the bumps of the road. Unfortunately, the shock absorbers do not provide a very wide range of motion. When a six wheel vehicle encounters a large bump, the two front wheels, which can rise with respect to the rear wheels, pass over the bump with little problem. However, the two sets of rear wheels are close together and have no pivot axis between them and thus, have trouble moving over the bump.

SUMMARY OF THE PRESENT INVENTION

It is therefore an object of the present invention to present apparatus for providing a rear pivot axis to a vehicle having four rear wheels. The vehicle typically has a chassis and four rear wheels divided into two forward wheels and two rearward wheels.

Each half of the apparatus preferably includes an arm pivotally attached to the chassis, a rocking member and a ground directing unit. The rocking member is preferably pivotally attached to the arm at a central location on the rocking member and rotatably connected to one forward and one rearward wheel at front and back locations, respectively, of the rocking member. The ground directing unit is preferably pivotally attached to the arm (or to an extension thereof) and to the rocking member near the rearward wheel. This arrangement provides a force to the rearward wheel while no force is provided to the forward wheel and thus, provides a rear pivot axis to the vehicle.

Additionally, the present invention includes shock absorbing units pivotally attached between the arms and the chassis.

Moreover, the ground directing unit and the shock absorbing units preferably are formed of a damper and a spring.

Furthermore, in accordance with a preferred embodiment of the present invention, the rocking member is formed into a roughly V shape.

Still further, in accordance with a preferred embodiment of the present invention, the arm includes an extension to which the ground directing unit is attached.

The apparatus of the present invention can be utilized with any type of vehicle, such as a car, an all-terrain vehicle, a truck or a trailer. For vehicles which provide drive to their rear wheels, such as all-terrain vehicles, each half of the apparatus of the present invention can include a drive mechanism. The drive mechanism includes a rotating axis driven by a differential of the vehicle, two drive gears rotated by the axle, two follower gears, one per wheel, and two timing belts, each connecting between their respective drive and follower gears.

BRIEF DESCRIPTION OF THE DRAWINGS

The present invention will be understood and appreciated more fully from the following detailed description taken in conjunction with the drawings in which:

FIG. 3 is a schematic illustration, similar to FIG. 1A, of an alternative embodiment useful for rear drive vehicles.

DETAILED DESCRIPTION OF A PREFERRED EMBODIMENT

Figure 1A:
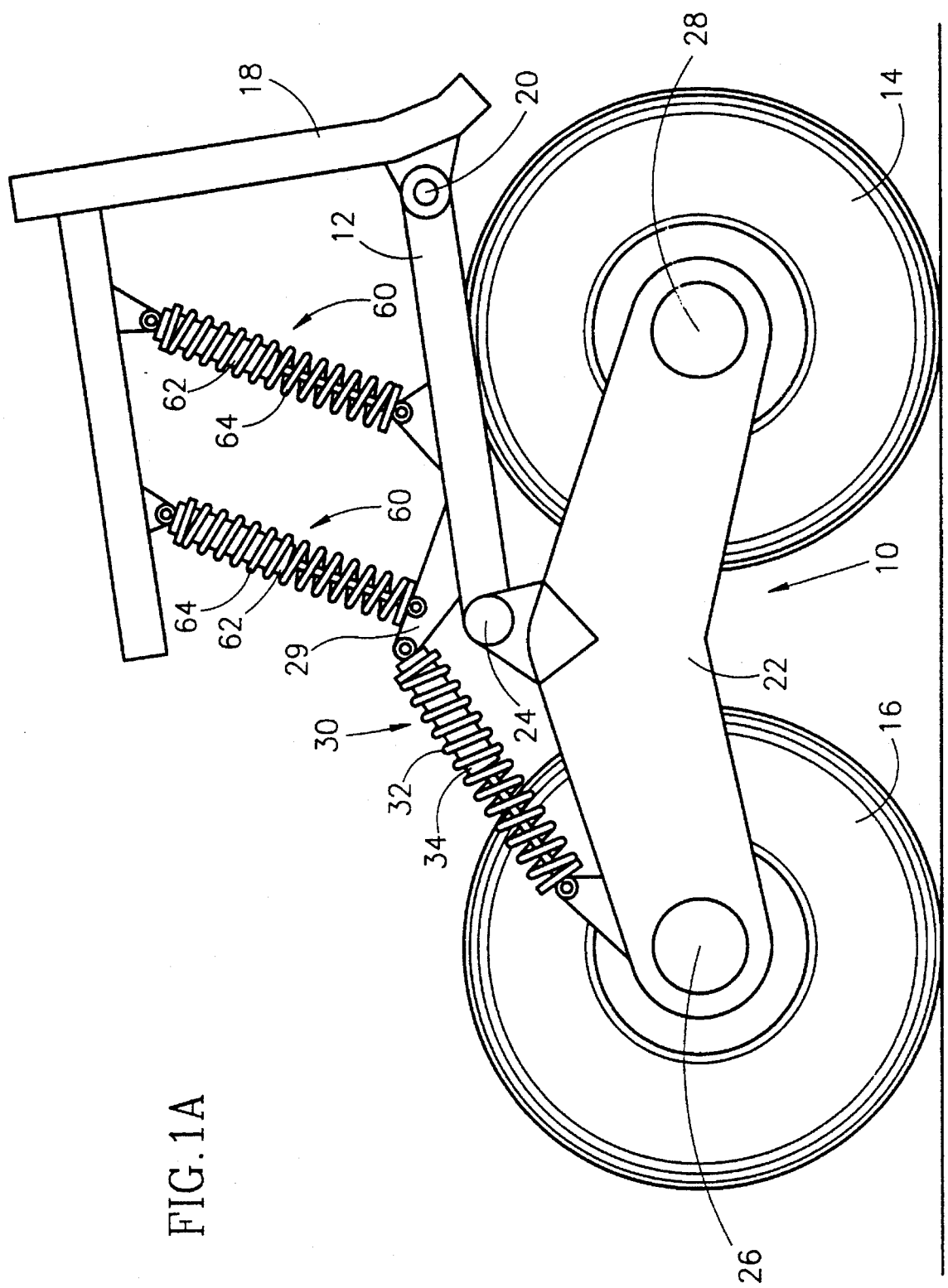
FIGS. 1A, 1B and 1C are schematic side view illustrations of the apparatus of the present invention on level ground, in the presence of a rock and in the presence of a hole, respectively.
Figure 1B:
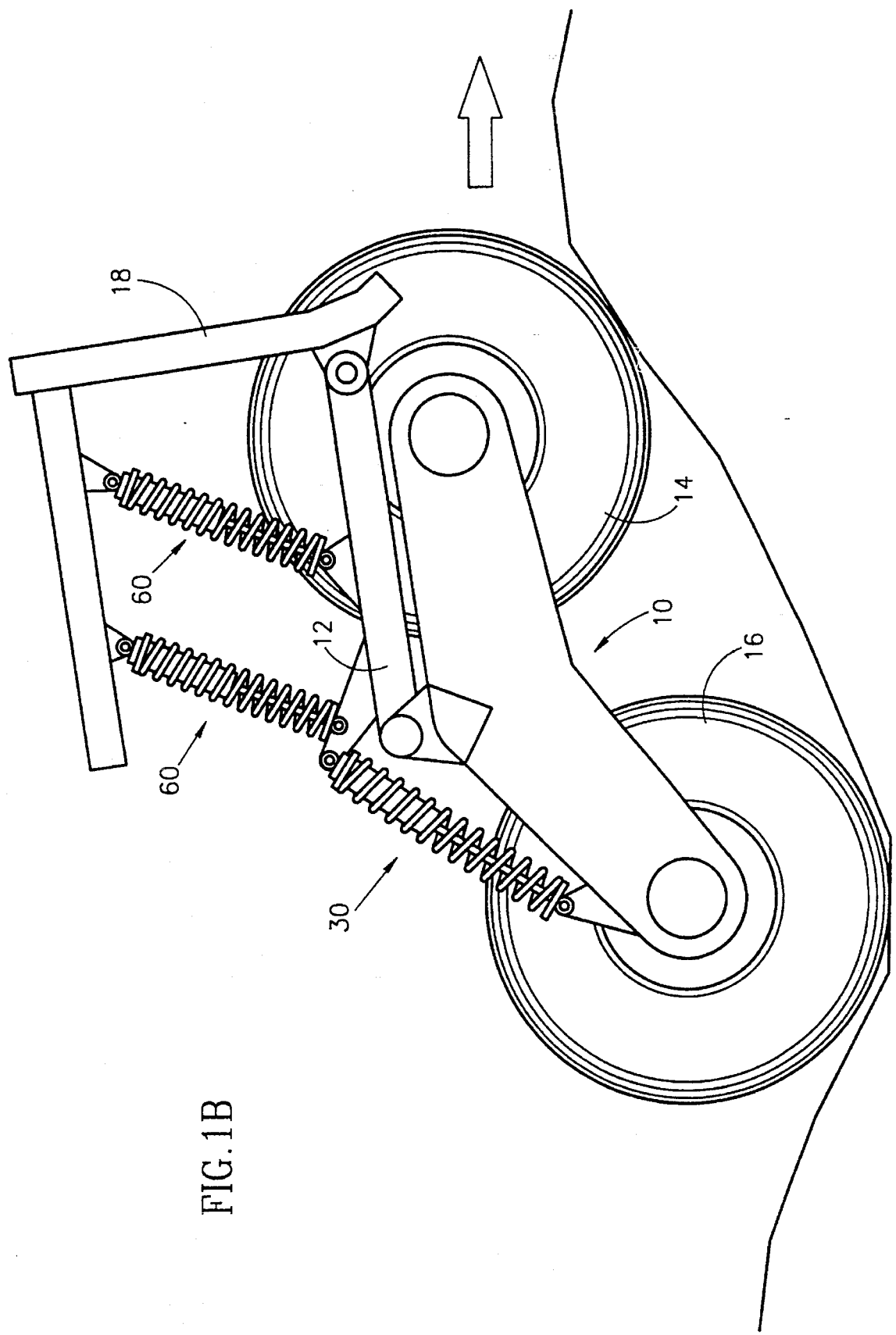
Figure 1C:
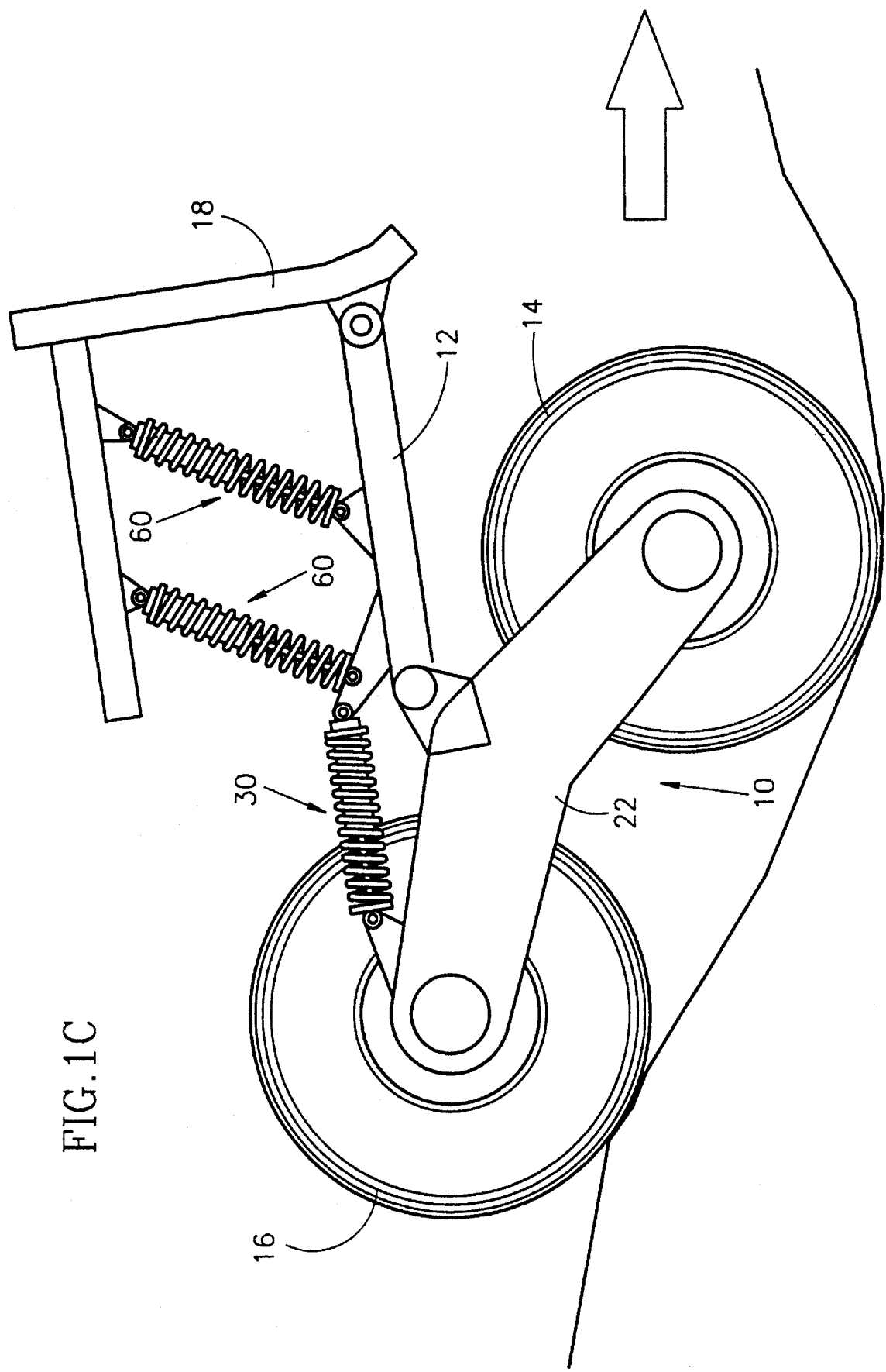
Figure 2:
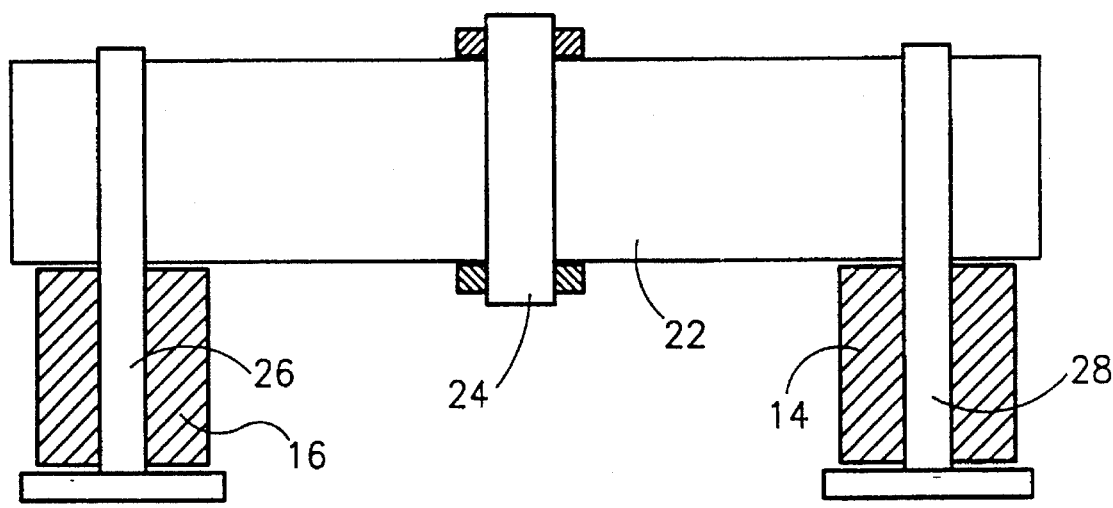
FIG. 2 is a top view illustration of a rocking member forming part of the apparatus of FIG. 1A.

Reference is now made to FIGS. 1A, 1B and 1C which illustrate the two rear sets of wheels of the vehicle with the apparatus of the present invention. FIGS. 1A, 1B and 1C are side views and illustrate the vehicle in three states, that of level ground, near a rock and near a hole, respectively. Reference is also made to FIG. 2 which is a top view of a rocking member forming part of the invention.

The apparatus 10 of the present invention is operative to provide a rear pivot axis to the vehicle and typically comprises two halves, one for each side of the vehicle. Each half of the apparatus 10 utilizes an arm 12 forming part of the suspension system of the vehicle and connects it to a forward and a rearward set of wheels 14 and 16, respectively. As in the prior art, arm 12 is pivotally attached to the chassis 18 of the vehicle via hinge 20.

In accordance with the present invention, a rocking member 22 is pivotally attached to arm 12 via axis 24. Forward and rearward wheels 14 and 16 are attached to rocking member 22 via axes 26 and 28 (FIG. 2).

Each half of the apparatus additionally comprises a ground directing unit 30 which is pivotally connected to an extension 29 of arm 12, and to the rocking member 22 near the axis 26 of the rear wheel 16. Unit 30, typically comprising a spring 32 and a damper 34, provides a downward force to its corresponding rearward wheel 16. No similar unit is provided to the forward wheels 14.

Therefore, when the forward wheels 14 rise to travel over a rock (FIG. 1B), the springs 32 of units 30 push the rearward wheels 16 downwards and the rocking members 22 rotate about the axis 24. When the forward wheels 14 fall forwards, such as occurs when falling in a hole (FIG. 1C), the rocking members 22 rotate once again and the rearward wheels 16 rise until the damper 34 is fully compressed.

Thus, in both situations, since units 30 act only on the rearward wheels 16, they force the axis 28 of rearward wheels 16 to become a pivot axis about which the vehicle can rise and fall.

As the wheels 14 and 16 rise and fall, the arms 12 pivot about hinge 20 with respect to the vehicle chassis 18. Shock absorbing units 60, pivotally connected between the arms 16 and the chassis 18, minimize the rotation between the arms 16 and the chassis 18. Shock absorbing units 60 are typically the standard shock absorbers 62 and springs 64 normally forming part of the vehicle. If desired, the rear shock absorbing unit 60 can be connected to extension 29 of arm 12.

Since the wheels 14 and 16 are connected to the arm 12 through rocking member 22, rather than directly to the end of arm 12 as in the prior art, the chassis 18 is continually maintained above surface 28.

Should both sets of wheels 14 and 16 become airborne, spring 32 of unit 30 extends, causing the rearward wheels 16 to be extending. Thus, upon landing, the rearward wheels 16 touch first and dampers 34 absorb some of the landing force. Afterwards, the forward wheels 14 land and shock absorbing units 60 aid in absorbing the remaining landing force.

Figure 4:
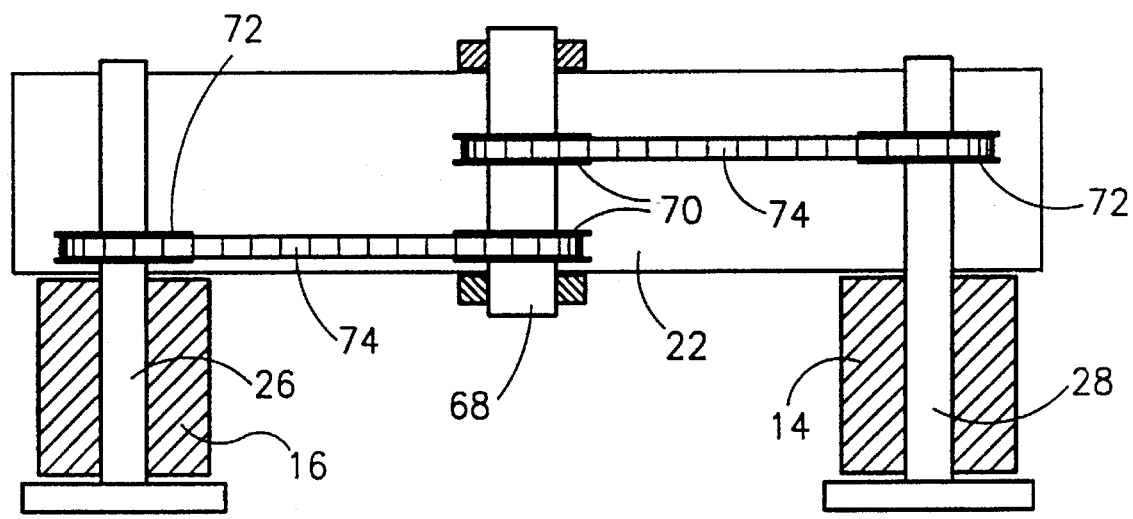
FIG. 4 is a top view illustration, similar to FIG. 2, of a drive mechanism forming part of the apparatus of FIG. 3.

Reference is now made to FIGS. 3 and 4 which illustrate an alternative embodiment for use in vehicles with rear wheel drive. This embodiment includes a drive mechanism in addition to the other elements of the apparatus for providing a pivot axis. Similar elements are referenced with similar reference numerals.

The embodiment of FIGS. 3 and 4 additionally comprises an axis 68 driven by the differential (not shown) of the vehicle and located within rocking member 22 near axis 24, two drive gears 70 rotated by the axis 68, two follower gears 72, one per wheel, and two timing belts 74. Timing belts 74 connect between their respective drive gears 70 and follower gears 72.

As shown in FIG. 3, the drive gear 70 is higher above the ground, labeled 28, than the follower gears 72, thereby to ensure that no portion of the chassis 14 touches the ground 28.

It will be appreciated by persons skilled in the art that the present invention is not limited to what has been particularly shown and described hereinabove. Rather the scope of the present invention is defined by the claims which follow.

I claim:

1. Apparatus providing a pivot axis for rear wheels of a vehicle, the vehicle having a chassis and four rear wheels divided into two forward wheels and two rearward wheels, the apparatus comprising:

two halves, each half including
      an arm pivotally attached to the chassis:
   a rocking member pivotally attached to said arm at a central location on said rocking member and rotatably connected to one forward and one rearward wheel at front and back locations, respectively, of said rocking member; and
   a ground directing unit pivotally attached to said arm and to said rocking member near said rearward wheel which provides a force to said rearward wheel while no force is provided to said forward wheel.

2. Apparatus according to claim 1 and wherein said ground directing unit comprises a damper and a spring.

3. Apparatus according to claim 1 and wherein said rocking member is formed in roughly a V-shape.

4. Apparatus according to claim 1 and wherein said arm comprises an extension to which said ground directing unit is attached.

5. Apparatus according to claim 1 and also including shock absorbing units pivotally attached between said arm and said chassis.

6. Apparatus according to claim 5 and wherein said shock absorbing units each comprises a damper and a spring.

7. Apparatus according to claim 1 wherein said vehicle further includes a drive mechanism comprising:

a rotating axis driven by a differential and located within said rocking member,
   two drive gears rotated by said axis;
   two follower gears, one per wheel; and
   two timing belts connected between their respective drive and follower gears.

8. Apparatus according to claim 7 wherein said drive gear is higher above the ground than are said follower gears.

9. Apparatus providing a pivot axis for rear wheels of a vehicle, the vehicle having a chassis, and at least two rear wheels divided into a forward wheel and a rearward wheel, the apparatus comprising:

an arm pivotally attached to the chassis;
   a rocking member pivotally attached to said arm at a central location on said rocking member and rotatably connected to said forward and said rearward wheel at front and back locations, respectively, of said rocking member; and
   a ground directing unit pivotally attached to said arm and to said rocking member near said rearward wheel which provides a force to said rearward wheel while no force is provided to said forward wheel.

10. Apparatus according to claim 9, wherein said ground directing unit includes a damper and a spring.

11. Apparatus according to claim 9, wherein said rocking member is formed in roughly a V-shape.

12. Apparatus according to claim 9, wherein said arm includes an extension to which said ground directing unit is attached.

13. Apparatus according to claim 9, further including shock absorbing units pivotally attached between said arm and said chassis.

14. Apparatus according to claim 13, wherein said shock absorbing units each include a damper and a spring.

15. Apparatus according to claim 9 wherein said vehicle further includes a drive mechanism comprising:

a rotating axis driven by a differential and located within said rocking member,
   two drive gears rotated by said axis;
   two follower gears, one per wheel; and
   two timing belts connected between their respective drive and follower gears.

16. Apparatus according to claim 15 wherein said drive gear is higher above the ground than said follower gears.

* * * * *